United States Patent [19]

Lawless et al.

[11] Patent Number: 4,923,491
[45] Date of Patent: May 8, 1990

[54] CENTRIFUGAL FILTER FOR SEPARATING AEROSOL PARTICLES FROM A GAS STREAM

[75] Inventors: Philip A. Lawless; Andrew S. Viner, both of Durham, N.C.

[73] Assignee: Research Triangle Institute, Research Triangle Park, N.C.

[21] Appl. No.: 293,420

[22] Filed: Jan. 4, 1989

[51] Int. Cl.$^5$ .............................................. B01D 45/00
[52] U.S. Cl. ....................................... 55/409; 209/144
[58] Field of Search .................................. 55/401–403, 55/406, 408, 409; 209/144

[56] References Cited

U.S. PATENT DOCUMENTS

| 2,991,844 | 7/1961 | Nomar | 55/408 |
| 4,268,281 | 5/1981 | Erickson | 55/408 |
| 4,361,490 | 11/1982 | Saget | 55/406 |

FOREIGN PATENT DOCUMENTS

| 272288 | 12/1912 | Fed. Rep. of Germany | 55/409 |
| 52897 | 6/1944 | France | 55/409 |
| 1223968 | 4/1986 | U.S.S.R. | 55/406 |

*Primary Examiner*—Bernard Nozick
*Attorney, Agent, or Firm*—Oblon, Spivak, McClelland, Maier & Neustadt

[57] ABSTRACT

A centrifugal filter for separating aerosol particles from a gas stream including a rotatable hollow hub and at least one pair of disks fixedly mounted in spaced apart relationship on the hub within a stationary housing mounted on the hub. The hub is perforated in the region between the two disks and is coupled to a vacuum pump so that the interior of the hub is at a lower pressure relative to the space between the disks. The hub is rotated, causing rotation of the disks. Aerosol particles in a flow gas are introduced between the disks and the housing at the periphery of the rotating disks. The pressure differential produced at the hub perforations draws the aerosol laden gas toward the hub. As the aerosol laden gas enters between the rotating disks and the housing, it experiences an acceleration to nearly the angular velocity of the disks, which results in a centrifugal force being applied to the aerosol particles in a direction opposite to the drag force exerted by the vacuum pump. The particles in the gas stream remain entrained in the outer periphery where they are removed, while the gas continues its motion toward the hub, thereby effecting separation.

3 Claims, 7 Drawing Sheets

CENTRIFUGAL FILTER FOR SEPARATING AEROSOL PARTICLES FROM A GAS STREAM

BACKGROUND OF THE INVENTION

1. Field of the Invention

This invention relates to the centrifugal separation of a particle laden gas into a particle-free stream and a particle-rich stream.

2. Discussion of Background

Several investigators have proposed methods for achieving the separation of particles from a gas stream by use of centrifugal force. One of the first was Braun (U.S. Pat. No. 165,785), who proposed the use of a rotating drum and internal vanes. In this design, particles are flung against the inner wall of the rotating drum and deposited. Once deposited, the mass of particles continues to move under the influence of the centrifugal force to a central gutter, from which it can be removed by means of a valve.

In the approach used by Lincoln (U.S. Pat. No. 431,336), several flat disks are placed parallel to each other on a hollow hub. Each disk is fitted with several scoop-like attachments. While the disks rotate about the hub, a gas flow is introduced parallel to the disks. The scoop-like attachments on the disks serve as particle impaction surfaces where particles are deposited. By the centrifugal influence of the rotating assembly, the particles are swept into a channel that leads to the hollow hub. Once inside the hollow hub, the particles drop into a hopper for later removal.

The operating principle of Sakowski's apparatus (U.S. Pat. No, 2,849,078) is very similar to that of Braun. Cylindrical pipes are formed into semicircles. Four semicircles are joined so as to form two circles, the planes of which are at right angles to each other. A particle bearing gas is introduced at the juncture of the four semicircles and flows through the pipes to an exit manifold at the other juncture of the pipes. At the apex of each semicircle (midway between the inlet and exit manifolds) is an exit tube connected to another circle-shaped pipe. The entire apparatus is mounted in a rotatable fixture. The rotational motion of the apparatus produces a centrifugal force on the particles in the gas and causes them to impact against the surfaces of the pipes. The collected particle mass is emitted through the exit tubes into the outermost pipe circle, from which it is dropped into a stationary gutter for later removal.

The invention of Bouru (U.S. Pat. No. 3,561,195) was designed for the removal of oil droplets from a gas stream, but also has application to removal of solid particles. This device relies upon a cylinder fitted with a large number of vanes and mounted coaxially with a pipe for evacuation of the purified gas. In the design, an annular inlet space is formed between the outer cylinder and the coaxial pipe, and the entire assembly is rotatably mounted. The rotational motion of the assembly imparts a centrifugal force on the particles in the entering gas stream. The particles are then impacted on the vanes and inner surfaces of the outer cylinder. Centrifugal force on the collected particles causes them to migrate to the outermost edge on the interior of the cylinder. The cleaned gas is redirected towards the evacuation pipe while the collected particles are emitted from the outer cylinder by means of small holes in the periphery. While it is clear that collected oil droplets would easily flow through these openings, successful operation with solid particles appears uncertain.

Peterson et al (U.S. Pat. No. 4,134,744) also use a rotating disk in a particle collection device. In their approach, the disk is composed of electrically isolated wedges that are oppositely charged. A dielectric fluid is continually pumped onto the surface of the disk where it is dispersed by the centrifugal force of the rotation. Charged particles are attracted to the polarized surfaces of the disk where they impact with the dielectric fluid, whereupon they become fixed in the fluid. As the fluid is centrifugally pumped to the edge of the disk, the particles are carried with it, eventually to be flung against a toroidal ring that serves as a gutter for fluid removal. In this device the particles are collected by electrostatic forces and then fixed in a solution. The centrifugal action simply serves as a means for continually renewing the solution surface on the disk.

Another centrifugal-based device is that of Alink et al (U.S. Pat. No. 4,512,759) in which a gas stream is introduced into a diverging cone that rotates. This device is similar to that of Braun, in that the rotating vessel imparts a rotational flow to the particles in the gas stream. As a result of centrifugal force the particles are flung against the wall of the rotating cone where they remain deposited. The collected mass of particles moves to the edge of the diverging cone where it is deposited in a concentric duct and falls by gravity into a hopper for later removal.

The device of Andersson (U.S. Pat. No. 4,530,462) separates pneumatically conveyed streams of solid or liquid particles into a number of streams containing equal concentrations of particles. Particles are carried by centrifugal force resulting from a rotational flow induced by means of a series of helical flow channels. The particles are flung against a collecting surface and migrate to a buffer area. From the buffer, the particles are either deposited uniformly around the circumference of a collection plate or are dropped into hopper regions to be reentrained with the redistributed gas flow.

All of the devices described above rely upon impaction of the dust against a surface to achieve separation from the gas stream. Several other devices have been developed for the separation of particles from a gas stream. The invention of Mercier et al and Ehlinger (U.S. Pat. No. 2,603,309) employs a rapid change of flow direction for gas at high velocities. In this device, a gas stream exits a narrow channel between parallel plates at high velocity. Inertial force carries particles towards a hopper region where they may impact on surfaces or settle under the influence of gravity. The gas stream is evacuated through a narrow channel parallel and immediately adjacent to the inlet channel. Lefkowitz (U.S. Pat. No. 4,473,384) extended this approach by introducing an impaction stage at the exit of an accelerator nozzle. In this approach, particles are impacted on the surfaces of circular bands, which are attached to a rotating drum. The circular impaction bands are swept clean by a brush-type apparatus as the drum rotates. As before, the gas experiences a rapid change of flow direction and is evacuated through the hollow hub of the rotating drum.

Another particle separation device is that of Tillman et al. (U.S. Pat. No. 3,252,275), which is intended for the collection of agglomerating particles (especially titanium dioxide). This device consists of a drum with a rotating paddle on the inside. The rotating paddle enhances the agglomeration of particles. As the particles grow, they settle by gravity to the bottom of the chamber where they are removed to a hopper. This device would be of limited utility in the case of a non-agglomerating aerosol.

SUMMARY OF THE INVENTION

Accordingly, one object of this invention is to provide a novel centrifugal filter for separating aerosol particles from a gas stream which avoids the buildup of deposits within the filter and thereby simplifies maintenance of the filter.

A further object of this invention is to provide a novel centrifugal filter which avoids buildup of deposits within the filter by maintaining the aerosol particles in suspension so as to produce a concentrated stream of aerosol particles which is easily removable from the filter without impacting on a surface within the filter.

Another object of this invention is to provide a novel centrifugal filter which is mechanically simple and which employs a minimum of parts.

Still another object of this invention is to provide a novel centrifugal filter capable of selectively removing particles from a gas stream based on the size of the particles.

Another object of this invention is to provide a novel centrifugal filter capable of obtaining a continuously variable particle size cutoff point.

Another object of this invention is to provide a novel centrifugal filter useful in measuring aerosol or particle concentrations at very low levels.

These and other objects are achieved according to the present invention by providing a new and improved centrifugal filter for separating aerosol particles from a gas stream including rotatable hollow hub, a stationary housing mounted on the hub and having an inlet for introducing an aerosol particle laden gas stream into the housing and an outlet for removing aerosol particle enriched gas from the housing, a pair of disks fixedly mounted on the hub and rotatable with the tube, the hub having an interior space communicating with a space between the disks by means of perforations provided in the hub between the disks, a vacuum pump for producing a lower pressure in the interior space of the hub than in the space between the disks, and means for rotating the hub and the disks within the stationary housing.

According to the invention, the particle laden gas stream is introduced tangentially into the space between the periphery of the disks and the housing, and the lower pressure in the hub interior space relative to the space between the disks draws gas from the housing inlet to between the disks. Rotation of the disks then imparts a rotational motion on the gas and the particles between the disks and the housing, with a resulting centrifugal force acting on the particles in a direction opposite to the drag force produced by the pressure differential, resulting in production of a particle enriched gas stream in the space between an outer surface of said housing and the periphery of the disks, where the particle enriched gas stream, with the particles maintained in suspension, is removed from the housing via the housing outlet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
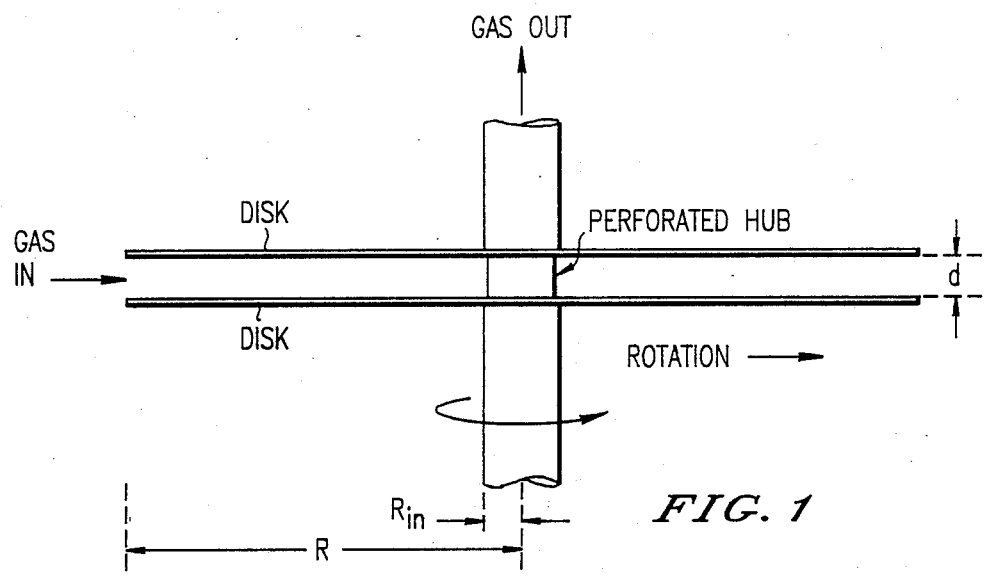
FIG. 1 is a side view of key elements of the centrifugal filter of the present invention and is illustrative of the principle of operation of the present invention.

Referring now to the drawings, wherein like reference numerals designate identical or corresponding parts throughout the several views, and more particularly to FIG. 1 thereof, there is shown schematically a centrifugal filter of the invention. This centrifugal filter take a gas stream with a low particle concentration and separates it into two streams, one with a relatively high concentration of particles and the other with almost no particles, by operating as a centrifugal pump in reverse. The filter has two parallel disks 10 and 12 which are separated by a perforated hub 14. A vacuum pump (not shown) pulls gas from between the disks 10 and 12 through the perforated hub 14 while the disks 10 and 12 rotate. The rotation of the disks 10 and 12 imposes a centrifugal force on both the gas and the particles in the gas. The gas will tend to flow from the outer rim of the disks 10 and 12 to the perforated hub 14 because of the pressure differential imposed by the vacuum pump. The centrifugal force on the particles, however, is much greater than the drag force exerted on the particles by the gas flowing inward. As a result, the particles are expelled from the rotating gas stream. Thus, the filter separates the particles from the gas by taking advantage of the difference of forces acting on the gas and particles.

The rotation of the disks imposes a rotational motion on the gas between the disks. As an initial approximation, it is assumed that the gas is moving at the same angular velocity as the disk. Furthermore, it is assumed that a particle in the gas moves at the same velocity as the gas. The centrifugal force on the particle that results from the rotational motion then is:

$$F_c = m\omega^2 r \quad (1)$$

where $F_c$ = the centrifugal force on the particle (N)

m = the mass of the particle (kg)

ω = the angular velocity of the particle (1/s)
r = the radial position (m).

At the outer edge of the disks, the centrifugal force acting on a particle is $m\omega^2 R$, where R is the outer radius of the disks. The mass of the particle is the product of the density and the volume. For spherical particles the mass is:

$$m = \frac{4}{3}\pi r_p^3 \rho_p \quad (2)$$

where
$r_p$ = the radius of the particle (m)
$\rho_p$ = the density of the particle (kg/m³).

By combining equations 1 and 2, one observes that the centrifugal force on a particle rises rapidly with particle size for a given density.

At the same time that the gas and particles are rotating, the gas is being drawn to the center of the rotating disks. The flowing gas exerts a drag force on the particles in the gas stream, thus drawing the particles towards the disk hub. This drag force can be expressed by Stokes Law:

$$F_s = \frac{6\pi \eta v\, r_p}{C} \quad (3)$$

where
$F_s$ = the Stokes force on the particle (N)
$\eta$ = the gas viscosity (kg/ms)
$v$ = the gas velocity in the radial direction (m/s)
$r_p$ = the particle radius (m)
C = the Cunningham slip correction factor (dimensionless).

The radial gas velocity v at the outer edge of the disks can be calculated as:

$$V = \frac{Q}{A} \quad (4)$$

where
Q = the gas flowrate (m³/s)
A = the flow area at the edge of the disk (m²).

The flow area at the edge of the disk can be calculated as:

$$A = 2\pi R d \quad (5)$$

where
R = the outer radius of the disk (m)
d = the width of the gap between the disks (m).

Substituting these expressions in equation 3 yields:

$$F_s = \frac{3\eta Q r_p}{RdC} \quad (6)$$

In this case, the force acting on the particle is linearly related to the particle size and is acting in the direction opposite that of the centrifugal force.

Table 1 lists the key parameters of a working embodiment of the invention. The parameters listed in Table 1 were used to compare the magnitude of forces acting on particles in the sub-micron size range.

TABLE 1

| TEST PARAMETERS USED IN SAMPLE CALCULATIONS | | |
|---|---|---|
| Disk radius (R) | 15 | cm |
| Disk spacing (d) | 1 | mm |

TABLE 1-continued

| TEST PARAMETERS USED IN SAMPLE CALCULATIONS | | |
|---|---|---|
| Particle density ($\rho_p$) | 1 | g/cm³ |
| Angular velocity ($\omega$) | 377 | s⁻¹ (i.e. 3600 rpm) |
| Gas flowrate (Q) | 4.6 | liters/min |
| Gas density ($\rho_p$) | 1.2 | kg/m³ |
| Viscosity | 1.8E-5 | kg/m/s |

Figure 2:
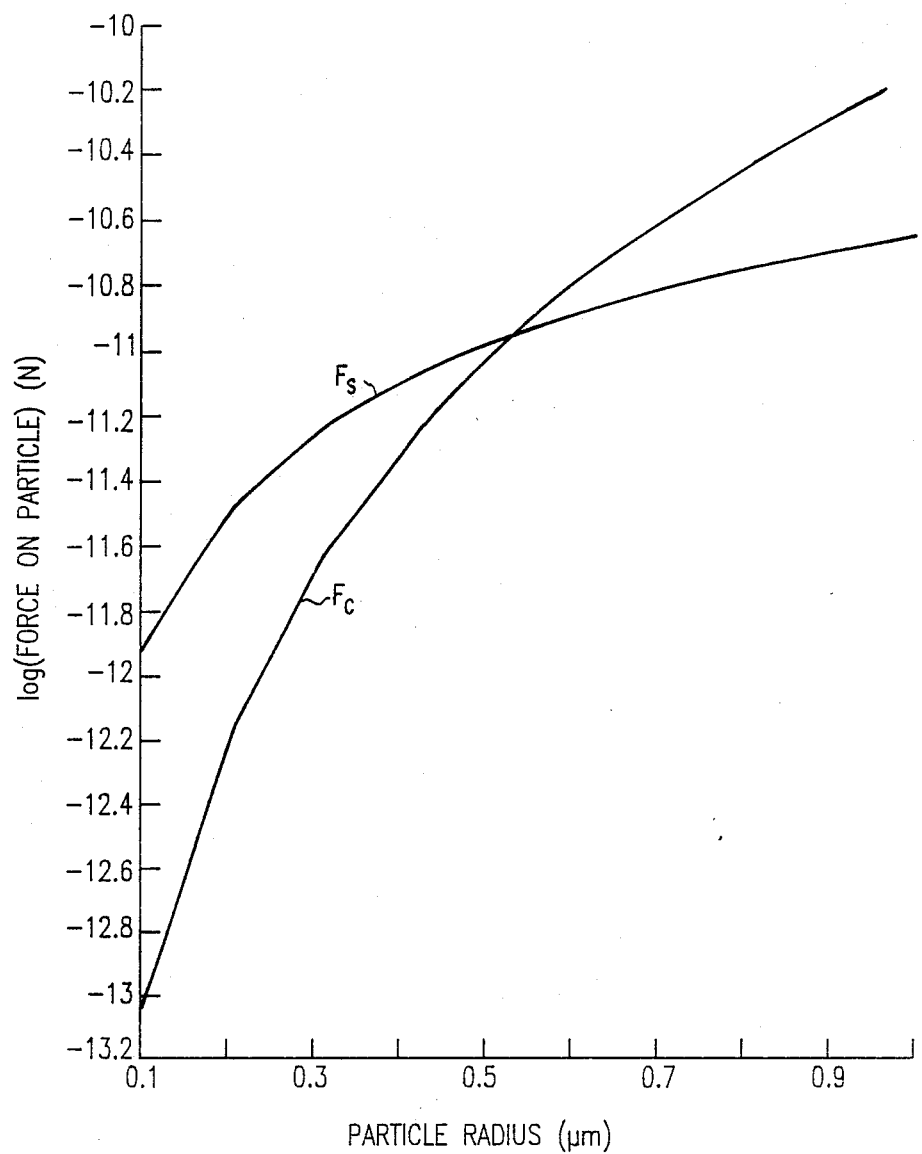
FIG. 2 is a graph illustrating the relationship between particle size, Stokes force and centrifugal force in the centrifugal filter of the present invention.

FIG. 2 shows a semi-log plot of the magnitude of these forces over a range of sub-micron particle sizes. Recalling that these forces are acting in opposite directions, one observes that the Stokes force is dominant for small particles, but the centrifugal force rises rapidly with particle size. For a particle radius of 0.5 μm, in the filter having the parameters noted in Table 1, the forces are equal, and for larger particles the centrifugal force is dominant.

Figure 3:
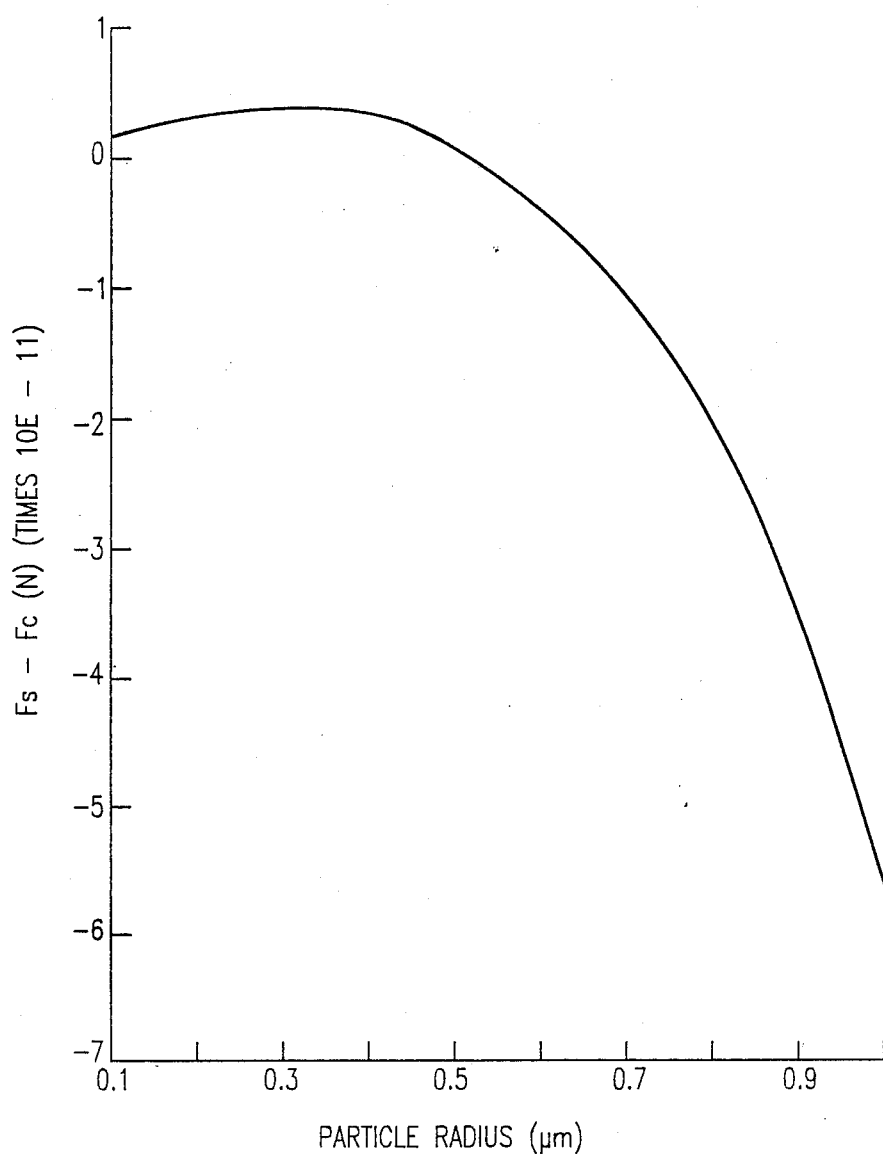
FIG. 3 is a graph illustrating the difference between Stokes and centrifugal forces as a function of particle size whereby the cut point particle size can be determined.

The net motion of a particle is determined by the difference between the Stokes and centrifugal forces as is evident from the graph of FIG. 3. For particles larger than 0.5 μm, the centrifugal force is dominant. Thus, the particles will be ejected from the gas stream. These ejected particles will be held in suspension between the outer edge of the rotating disks and the outer casing. For a particle with a radius of 0.5 μm, the Stokes force and the centrifugal force will be equal. Therefore, a particle of this size would be expected to rotate continuously with the gas stream at the outer edge of the disk, moving neither inward nor outward. (This condition defines the "cut-point radius" of the device). For even smaller particles, the Stokes force becomes dominant with the result that the particles will be drawn along with the gas towards the center hub of the disks where the gas exits. For the smallest particles, the Cunningham slip correction factor becomes important. This is manifested by the sharp drop in the magnitude of the Stokes force (see FIG. 2). Consequently, the difference between the Stokes and centrifugal forces begins to shrink at a particle size of about 0.3 μm.

The results shown in FIGS. 2 and 3 were generated by choosing parameters that would yield a cutpoint of 0.5 μm. The cutpoint could have been set at 0.3 μm, in which case all particles would be ejected from the disk (see FIG. 3). That is, none of the particles entrained in the inlet gas stream would penetrate the centrifugal force barrier imposed by the rotating gas. The ejected particles would remain in suspension, rotating at the outer edge of the disks. A gas sample drawn from this region would thus have a relatively high concentration of particles.

The results shown in the FIGS. 2 and 3 indicate that, for reasonable dimensions and operating conditions, it is possible to separate particles from a gas stream and produce a concentrated particle stream.

The following is further analysis regarding the operational characteristics of the centrifugal filter of the present invention.

By equating the centrifugal and Stokes forces, one obtains:

$$\rho_p\left\{\frac{4}{3}\pi r_p^3\right\}\omega^2 R = \frac{6\pi\eta r_p}{C}\left\{\frac{Q}{2\pi Rd}\right\} \tag{7}$$

Rearranging yields:

$$r_p = \left( \frac{\alpha QC}{dR^2\omega^2} \right)^{\frac{1}{2}} \quad (8)$$

where $$\alpha = \frac{9\eta}{4\pi \rho_p}.$$

Figure 4:
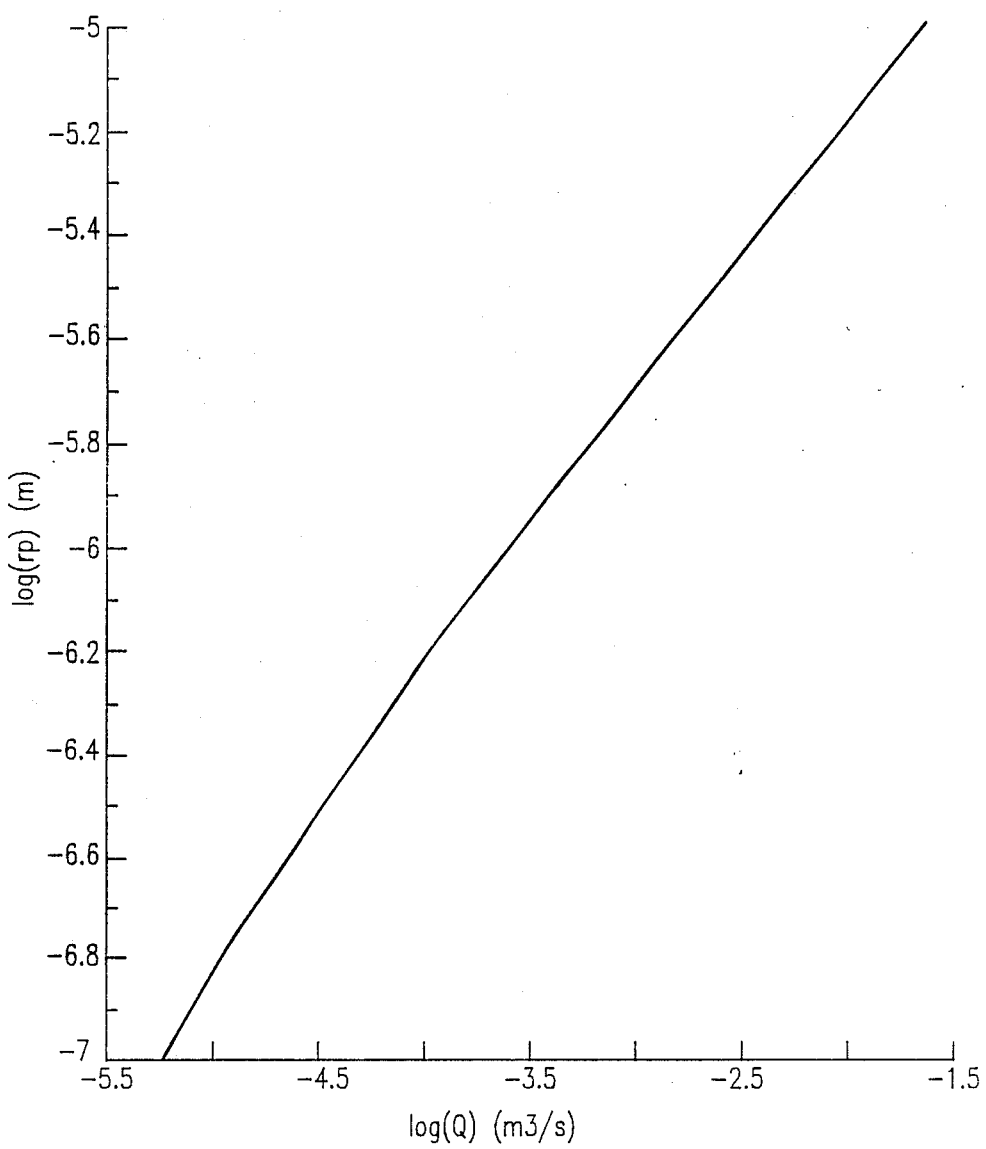
FIG. 4 is a graph illustrating the flowrate dependence of the cutpoint radius in the centrifugal filter of the present invention.
Figure 5:
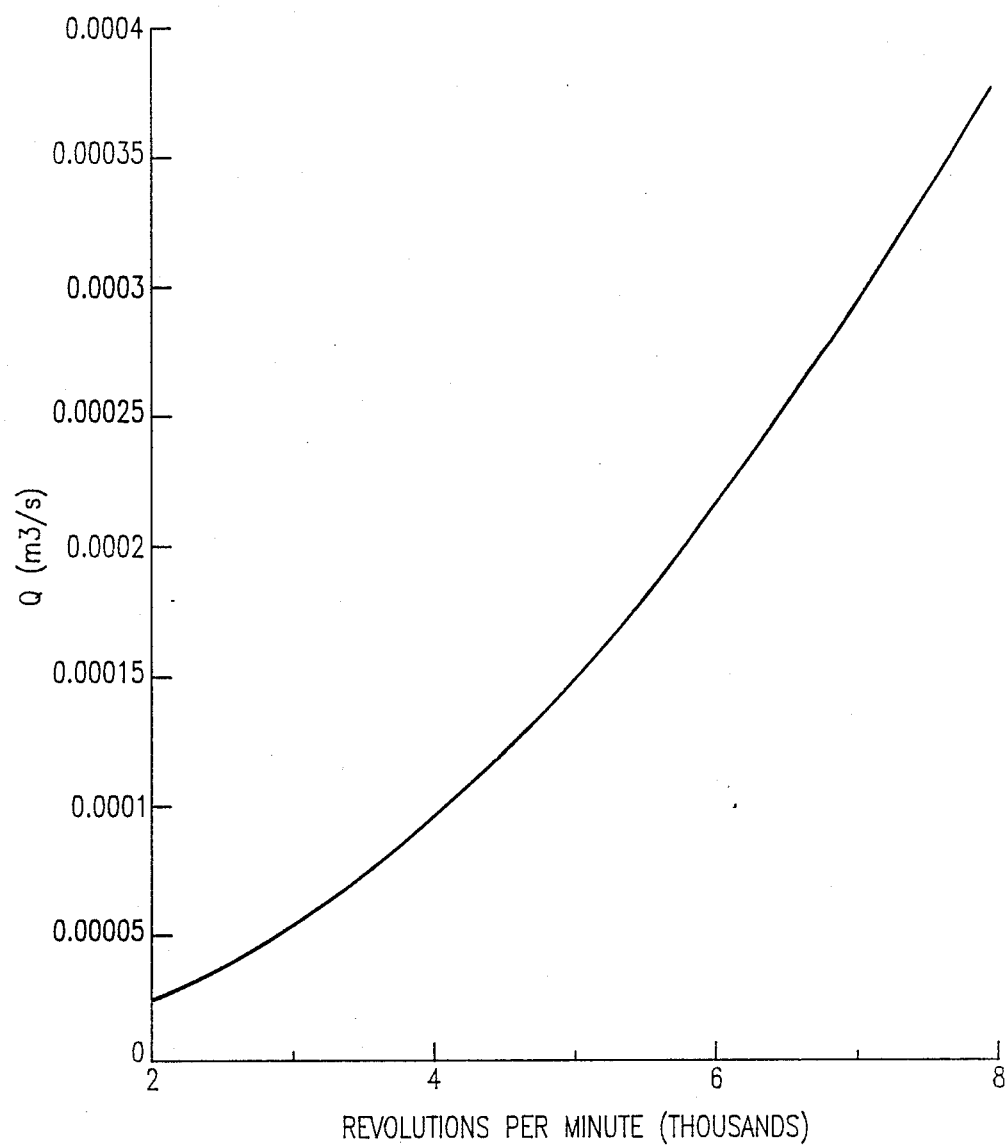
FIG. 5 is a graph illustrating the balance of flowrate and angular velocity, indicative of the fact that the velocity must be increased as the flowrate is increased to maintain a fixed cutpoint.

Equation 8 indicates that the cutpoint radius can be reduced either by reducing the gas flowrate (Q), or increasing the gap width (d), disk radius (R), or angular velocity (ω). The relationship between the cutpoint radius and the flowrate is illustrated in FIG. 4, where the parameters used to generate the curve are the same as those used for FIGS. 2 and 3. For the specified conditions, the flowrate must not be greater than 15 l/min to obtain a cutpoint of 1 μm. To lower the cutpoint radius to 0.3 μm, the flowrate must be reduced to approximately 2 l/min. It may not always be possible to reduce the flowrate, in which case the cutpoint radius can be reduced most easily by increasing the angular velocity of the gas stream. FIG. 5 illustrates the relationship between flowrate and angular velocity (expressed in rpm) for a fixed cutpoint radius (0.5 μm). If the disks are rotating at 4100 rpm, and a cutpoint radius of 0.5 μm is required then the flowrate cannot exceed 0.0001 m³/s (6 l/min). If one wishes to double the flowrate and maintain the same cutpoint, then the speed must be increased to 5800 rpm. These results are based on the assumption that the particles and gas are rotating at the same velocity as the disks. This assumption may not be adequate to accurately describe the performance of an actual system, but the trends are undoubtedly correct.

Next addressed is the pressure drop from the inlet to the outlet. There are two contributions to the pressure drop. First, there is the pressure drop that results from the decreasing flow area. According to Bernoulli's law, the pressure drop for flow from one point to another is inversely proportional to the difference of the flow areas at each point:

$$\Delta P = \frac{1}{2} \rho_g \left( \frac{Q}{2\pi d} \right)^2 \left( \frac{1}{R^2} - \frac{1}{R_{in}^2} \right) \quad (9)$$

where
$\rho_g$ = the density of the gas (kg/m³)
$R_{in}$ = the radius of the hub at the center of the disk (m).

The second contribution to the pressure drop results from the centrifugal force acting on the rotating gas. That is:

$$\Delta P = \rho_g \frac{\omega^2}{2} (R^2 - R_{in}^2). \quad (10)$$

The total pressure drop across the system can be estimated as the sum of equations 7 and 8:

$$\Delta P = \frac{-\rho_g}{2} \left( \frac{Q}{2\pi d} \right)^2 \left( \frac{1}{R^2} - \frac{1}{R_{in}^2} \right) + \omega^2 [R^2 - R_{in}^2] \quad (11)$$

Using the parameter set listed in Table 1, a pressure drop of 7.6 inches H₂O can be expected. In other words, the pump on the outlet of the device must be capable of pulling a vacuum of 7.6 inches at the specified flowrate (4.6 l/min). The easiest way to create a pump would be to attach a second, larger pair of parallel disks to the same shaft, as discussed hereinafter in more detail. The large disks would operate as a standard centrifugal pump. In this way, one motor could be used to drive both a pump and the aerosol concentrator.

A comparison of equations 6 and 9 provides insight into the tradeoffs inherent in the design of the filter of the present invention. As above noted, for a given flowrate, increasing the disk radius or angular velocity will result in a decrease of the cutpoint radius. Equation 9 reveals that the pressure drop will increase rapidly under these circumstances. As another example, consider the case where experimental conditions require a high flowrate. The equations indicate that both the cutpoint radius and pressure drop increase as the flowrate increases. Thus, it may be difficult to concentrate small particles at high flowrates. Interestingly enough, increasing the gap width between the disks (d), results in a reduction of both the cutpoint radius and the pressure drop. However, the assumptions on which this analysis is based will begin to break down as the gap width increases.

That is, it was assumed above that the gas and particles rotate with the same angular velocity as the parallel disks. In fact, only the gas nearest the disks will attain that velocity. The gas velocity decreases for volume elements farther from the disk surface. The net result of the velocity gradient is that the cutpoint diameter is not sharply defined; a small fraction of particles larger than the estimated cutpoint diameter will penetrate the energy barrier. As the gap between the disks increases the average gas velocity decreases, introducing error into the cutpoint estimated by equation 8. For small gaps (1 to 5 mm), the error should not be significant.

Figure 6:
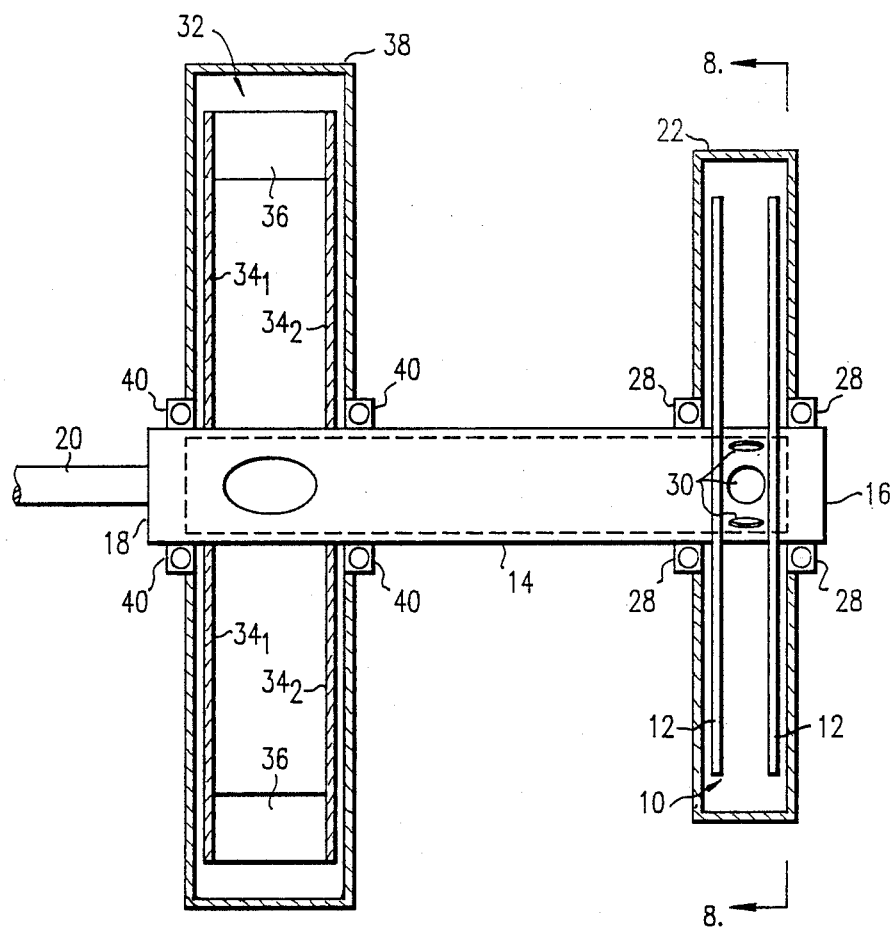
FIG. 6 is a schematic side view illustrating a preferred embodiment of the centrifugal filter of the present invention.
Figure 7:
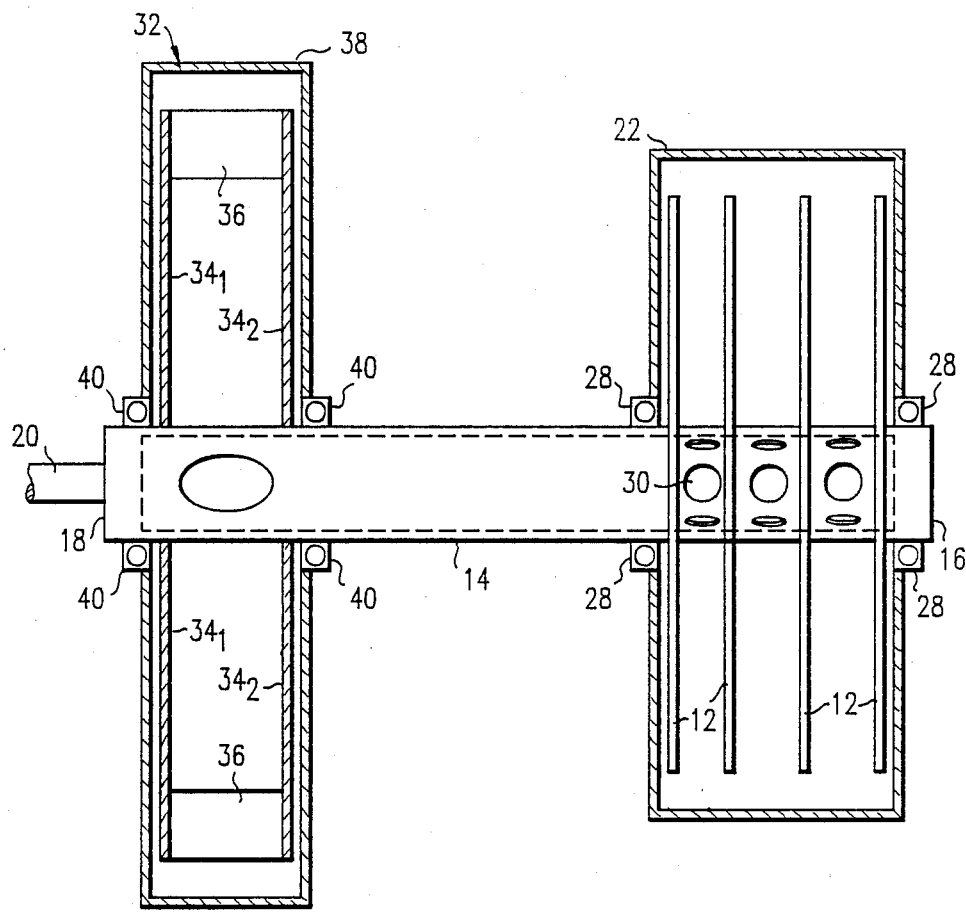
FIG. 7 is a schematic side view illustrating a variation of the embodiment showing FIG. 6, in which additional disks are added with the objective of increasing the volume of a gas treated.

Next described is a preferred embodiment of the invention. Referring to FIG. 6, the filter includes a pair 10 of disks 12 mounted parallel to each other on hub 14 formed of hollow hub that is capped at opposed ends 16, 18. The concept can be extended to multiple disks arranged in the same manner as illustrated in FIG. 7. A shaft 20 is connected to endcap 18 by means of a hole bored into the endcap 18. The shaft 20 is attached to a motor (not shown). The disks 12 are housed within a stationary casing 22 that completely surrounds the disks. The casing 22 is penetrated by two segments of pipe, shown in FIG. 8, which serve as an inlet 24 of particle bearing gas and an outlet 26 for removal of the concentrated stream. The casing 22 is attached to the hub 14 by means of ball bearings 28 or rotating gas seals and is held in place by support members (not shown). The surface of the hollow hub 14 is penetrated by small holes 30 in the gap between the parallel disks 12 such that the air enclosed by the housing 22 can communicate with the air inside the hollow hub 14.

Figure 8:
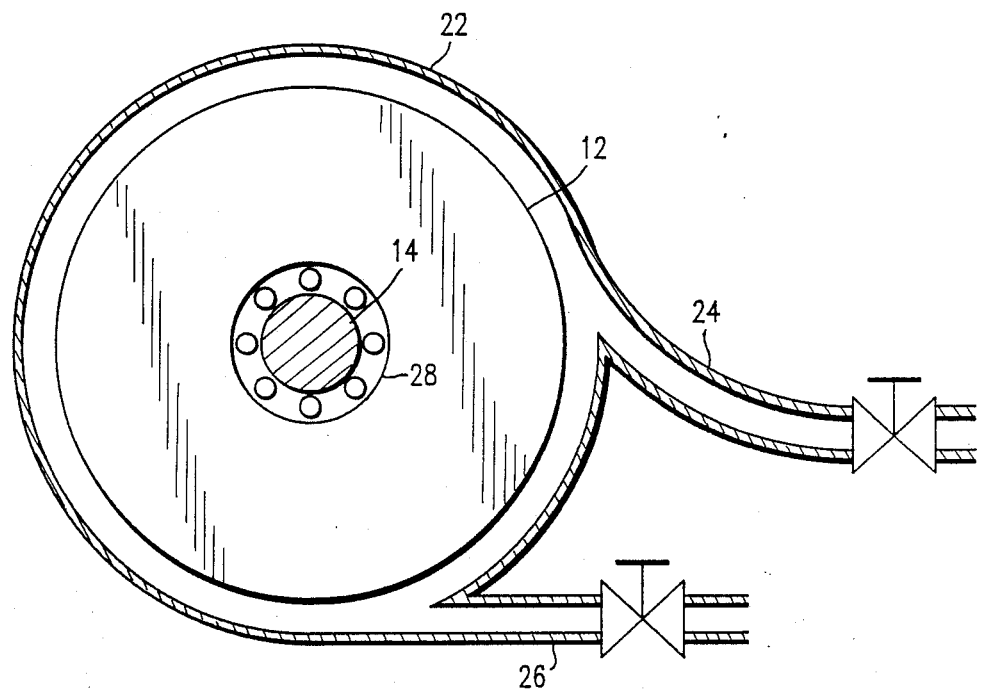
FIG. 8 is an end view taken at line 8—8 of FIG. 6.

Connected to the other end of the hollow hub 14 is a fan 32 consisting of support members 34₁, 34₂ and blades 36. The fan is enclosed in a stationary housing 38 that is attached to the hub 14 by means of ball bearings 40 and is held in place by support members (not shown). The surface of the hub 2 is penetrated by holes 42 between the parallel side walls of the housing 38. These holes 42 serve as the inlet for the air to the fan. The outlet (not shown) of the fan is a pipe tangent to the surface of the housing 38 in a manner similar to pipe 24 on housing 22 (FIG. 8).

The operation of the device is as follows. An electric motor imparts rotary motion to shaft 20 which is fixed to the hollow hub 14 by endcap 18. The hollow hub 14 rotates with the same frequency as the shaft 20, thereby rotating the parallel disks 12 and fan 32 as well. The force of the fan blades 36 acting on the gas within the housing 38 impels the gas out of the chamber through the exit (not shown) in the housing 38. The motion of the gas out of the fan housing 38 generates a pressure difference between the surface of the hollow hub 14 and the exit of housing 38, the lower pressure occurring at the surface where the gas passage holes 42 penetrate the hollow hub 14. This pressure differential extends through the hub 14 to the gas passage holes 30 communicating with the housing 22. As a result of this pressure differential, particle laden gas is drawn into hub 24 of housing 22, between the parallel disks 12 and into the hollow herb 14 through holes 30.

In the course of passing from the outer edges of the disks 12 to the holes 30 on the surface of the hollow shaft, the rotational motion of the disks 12 imparts a rotational motion on the gas and the particles within the gas. The resulting centrifugal force on the particles acts in the direction opposite that of the drag force, tending to impel the particles toward the outer surface of the housing 22. At sufficiently high rotation rates, the particles are maintained in suspension, rotating around the outer edge of the disk while the gas continues to flow to the hub 14. A separate pump (not shown) is then used to draw a gas sample that has a high particle concentration (relative to the inlet gas) out of the exit pipe 26.

There are several advantages to this device in comparison to the prior art. Although there are other devices that use centrifugal force to separate particles from a gas stream, all of the other devices have the goal of impacting and collecting the particles in a hopper or central holding area. The goal of the present invention is to maintain the particles in suspension so as to provide a concentrated stream. The distinction here is important because the act of impacting particles on surfaces or agglomerating particles changes their morphology and properties. By maintaining the particles in suspension, the present invention retains the original characteristics of the particles. Also, with the particles in suspension, there is no buildup of deposits which require cleaning within the filter. Thus, particles are handled gently, no cake is formed, and operation is continuous, without a cleaning cycle.

Another advantage of this filter over previous inventions is that the design is mechanically simpler, with a minimum of parts required. Although the device is shown with a fan attached to the shaft, any other means could be used so as to produce the desired pressure differential.

A third advantage, not available in other designs is the ability to obtain a continuously variable particle cut point. For example, at sufficiently high rotational frequencies, the separation efficiency is 100%—all particles are removed from the gas stream. At lower rotation rates, small particles are not susceptible t the centrifugal force and thereby remain with the flowing gas stream, exiting through the fan. This feature can be exploited to obtain a size-fractionated sample by cascading several such units, each operating at a successively higher rotation rate. The largest particles would by excluded in the first device of the series. The exhaust gas from this device would then be fed to a second unit operating at a higher velocity, and smaller particles would be withdrawn. The number of cascading units would only depend upon the cumulative withdrawal of side flows for removal of the particle streams.

In addition to the flexibility of rotation rate, particle size can also be modified by throttling the exhaust gas from the fan. Thus, there are several mechanisms to modify the particle size cutpoint. In combination, these mechanisms provide a wide range of particle cutpoints.

Further advantages of the centrifugal filter according to the invention are:

- it operates continuously, without a cleaning cycle;
- it can be sized to handle a wide range of gas volumes on a single motor by stacking additional disks on the shaft;
- it can be sized to separate large particles and allow smaller ones to pass through;
- absolute filtration of all particle sizes is theoretically possible, for example with a unit only about 6 inches in diameter;
- it can handle a wide range of particle loadings without deterioration of performance;
- the motive power for the air can be obtained by a fan mounted on the same shaft as the separation disks, allowing a compact unit to be built; and
- the mechanical construction is simple—the disks need not be very stiff since they operate under centrifugal tension normally, and they will be self-cleaning.

Potential disadvantages relative to other types of conventional separation technologies are: it is a rotating device, with the typical lubrication and sealing problems of other rotating devices; the disks may be subject to abrasion from the particles in the gas, although only at the outer periphery; power consumption may be higher than for conventional devices, although the preliminary theory does not show it to be out of line with other types of filters; and initial cost may be higher than for conventional filters, but may be offset by smaller size and lower maintenance costs.

This device has major potential commercial applications, particularly with the collection of valuable particles. For example, two reasons for performing such separations: the particles are valuable and need to be recovered, or the particles are harmful and need to be removed. The filter of the present invention could be used in both ways, but the former has the greater potential use.

In particular, in one application a flame reaction is used to produce titanium dioxide pigment as a very fine aerosol particle. In order to collect the particles, they are forced to agglomerate into larger clumps of particles so they can be captured in a conventional cyclone separator. Once collected, the clumps are milled to retrieve the original fine particles. The centrifugal filter in the present invention offers a way of collecting the fine particles directly, without the potential damage of the agglomeration and grinding. The concentrated side of the gas would be directed into a catch area where it could settle or be filtered. The volume of gas in the concentrated stream could be 100 to 1000 times less than the main flow.

In another application, industrial fume/dust filters are used to clean gases before venting to the atmosphere or recirculating. The amount of dust burden is so large that the filters would quickly clog if they could not be cleaned. Many filters operate for long periods with cleaning, but eventually deteriorate. Other problem dusts clog the filters in short order. The filter of the present invention would allow the same type of filtration without the cleaning or clogging problems. The only requirement would be that a sidestream of the concentrated dust be withdrawn for conventional treatment with a cyclone, settling chamber, or coarse filter.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A centrifugal filter for separating aerosol particles from a gas stream, comprising:

a rotatable hollow hub;

a stationary housing mounted on said rotatable hollow hub, said housing having an inlet for introducing an aerosol particle laden gas stream into said housing and an outlet for removing an aerosol particle enriched gas stream from said housing;

at least one pair of disks fixedly mounted in spaced apart relationship on said hub in said housing, said hub being perforated in a region between said disks so that an interior space of said hub communicates with the space between the disks;

vacuum pump means communicating with the interior space of said hub to produce a lower pressure in said hub than in the space between the disks;

means for rotating the hub and the disks mounted thereon while an aerosol particle containing gas stream is introduced into the space between said disks; and said inlet being arranged substantially tangential to the periphery of said disks so as to introduce said aerosol particle laden gas stream into said housing in an annular space between the periphery of said disks and said housing, and said outlet being arranged substantially tangential to said disks in communication with said annular space;

wherein rotation of said disks produces rotation of the particle laden gas stream between the disks, said vacuum pump means produces a drag force which pulls gas from the space between the disks through the perforated hub while the disks are rotated by said rotating means, and the aerosol particles within said gas stream are simultaneously subjected to centrifugal forces and drag forces so that aerosol particles remain entrained in said annular space with substantially no impaction and agglomeration against the housing and are at least partially separated from the gas stream to produce an aerosol particle enriched gas stream expelled from said housing via the housing outlet.

2. The centrifugal filter according to claim 1, wherein said vacuum pump means comprises:

a stationary pump housing mounted on said hub and communicating with the interior space of said hollow hub, said pump housing having an outlet; and a fan fixedly attached to said hub in said pump housing;

wherein rotation of said hollow hub by said rotating means produces rotation of said fan which forces gas in the pump housing out the pump housing outlet, thereby producing a pressure drop in the interior space of the hollow hub.

3. The centrifugal filter according to claim 2, wherein said fan comprises:

at least one support member fixedly connected to said hub at one end of the support member; and at least one blade member connected to an other end of said support member.

* * * * *